Oct. 7, 1947.  L. O. VINSON  2,428,641
HOLE ALIGNER AND SHEET METAL FASTENER
Filed July 24, 1944
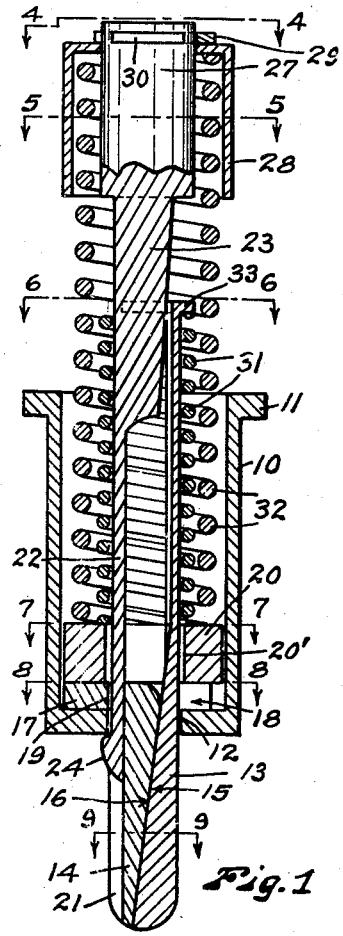
Fig. 1
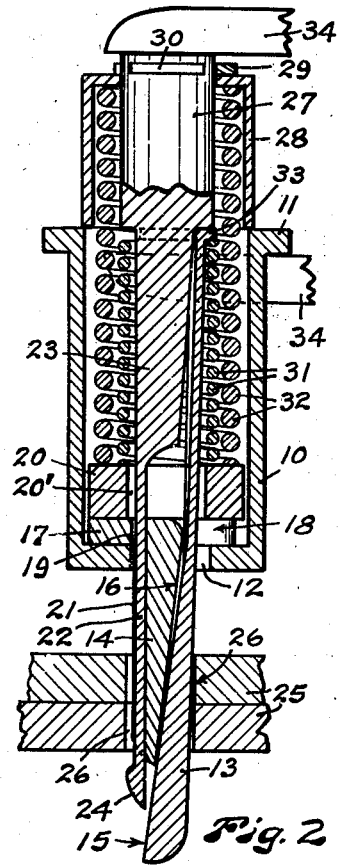
Fig. 2
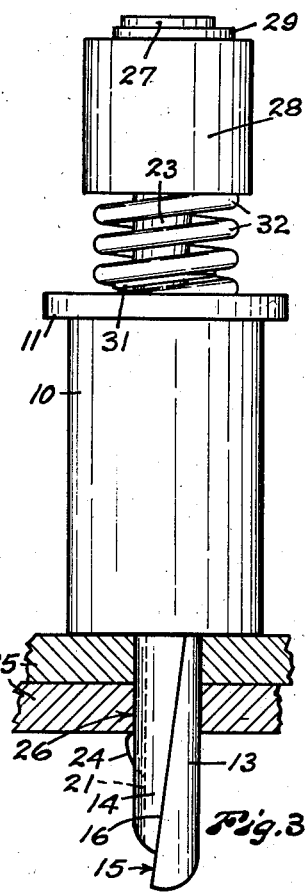
Fig. 3
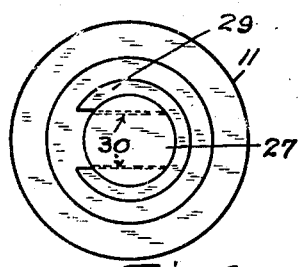
Fig. 4
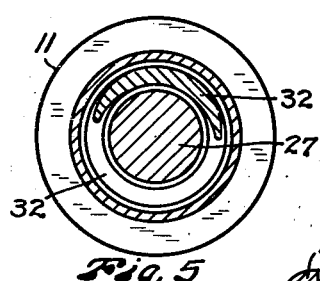
Fig. 5
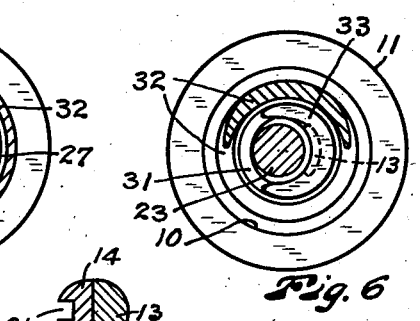
Fig. 6
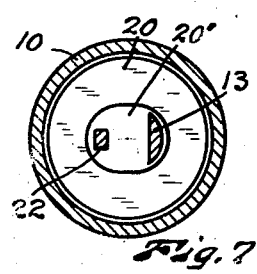
Fig. 7
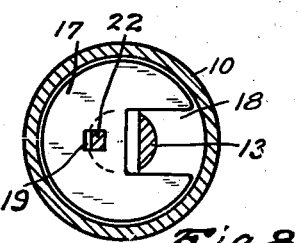
Fig. 8
Fig. 9
INVENTOR.
Loren O. Vinson
BY
Fred C. Matheny
ATTORNEY Patented Oct. 7, 1947

2,428,641

UNITED STATES PATENT OFFICE 2,428,641

HOLE ALIGNER AND SHEET METAL FASTENER

Loren O. Vinson, Seattle, Wash.

Application July 24, 1944, Serial No. 546,361

5 Claims. (Cl. 85—5)

1

This invention relates to a hole aligner and fastener of the type adapted for insertion through registering holes in two or more sheets of material, such as sheet metal, to accurately align said holes and to draw and temporarily hold the several sheets of metal firmly together while permanent fastening means, such as rivets, are being applied to said sheets.

An object of this invention is to provide a hole aligner and sheet metal fastener for use in registering holes of a plurality of overlapping sheets of material, such as sheet metal, which fastener has two relatively movable hole aligning members adapted to be expanded within the holes to accurately and exactly align said holes and further has means adapted to engage with and draw said sheets of material tightly together.

Another object is to provide a hole aligner and plate fastener which, after it has been applied to plates, will not be loosened by vibration, such as the vibration incident to riveting the plates, but instead will be tightened by such vibration and caused to more firmly draw the plates together and to more exactly align the holes that it occupies.

This device is of great utility in airplane construction in which any desired number of these devices may be inserted in and expanded in registering holes of two or more overlapping sheets of metal or other material to bring corresponding holes in the several sheets into accurate alignment and to temporarily draw and hold the sheets together with the holes accurately aligned while said sheets are being permanently riveted together or secured in some other suitable manner. After the sheets have been permanently fastened in a suitable number of places the temporary fasteners may be removed and suitable rivets inserted in the holes initially used by the temporary fasteners.

It is therefore an object of this invention to provide a hole aligner and temporary fastener that is simple in construction, easy to apply to and remove from holes in plates, inexpensive to manufacture and highly efficient in accurately aligning holes in plates and at the same time drawing and holding the plates together.

Other objects of this invention will be apparent from the following description taken in connection with the accompanying drawings.

In the drawings

Fig. 1 is a view in vertical section, with parts in elevation, of a hole aligner and plate tightener constructed in accordance with my invention and showing the same in an inoperative position.

2

Fig. 2 is a similar view showing my hole aligner and plate tightener fully compressed and with the hole aligning members fully contracted and positioned in registering holes in two overlapping plates.

Fig. 3 is a view in elevation showing this device in operation, the plates with which it is engaged being shown in section.

Fig. 4 is a top end view of this device looking in the direction of broken line 4—4 of Fig. 1.

Figs. 5, 6, 7, 8 and 9 are sectional views taken on broken lines 5—5, 6—6, 7—7, 8—8 and 9—9 of Fig. 1 respectively.

Like reference numerals designate like parts throughout the several views.

In the drawings 10 designates a housing, therein shown to be cylindrical. The end portion of the housing 10 that is shown at the top in the drawings is open and is provided with an external flange 11. The other end portion of the drawings has a substantially centrally disposed hole 12 therein.

Two hole aligning members 13 and 14 are carried by the housing 10 and extend through the hole 12. The hole aligning members 13 and 14 have inclined contacting flat faces 15 and 16 respectively that are oppositely tapered longitudinally of said hole aligning members to provide for expanding or contracting the over all diametrical size of said hole aligning members when said hole aligning members are relatively moved longitudinally of each other. The hole aligning member 14 has a rigidly connected head portion 17 disposed within the housing 10. The head portion 17, Fig. 8, is of generally circular shape and is provided with a notch 18 which affords working clearance for the hole aligning member 13. Also the head portion 17 is provided with a rectangularly shaped hole 19 to afford working clearance for the shank 22 of a hook member 23 hereinafter described. The hole aligning member 14 may be integral with the head portion 17, as shown in Figs. 1, 2, 3 and 8. A filler member and spring support 20 shaped like a thick washer and having an elongated hole 20' therein, Fig. 7, is provided in the housing 10 and rests on the head member 17.

A longitudinal groove 21 shaped like a keyway is provided in the hole aligning member 14 and the shank 22 of the hook member 23 is slidably disposed in said groove. The rectangular hole 19 is coincident with the upper end portion of the groove 21. An outwardly protruding rounded hook 24 is provided on the end portion of the shank 22. The hook 24 cooperates with the housing 10 in drawing together a plurality of plates 25 which have registering holes 26 therein, as hereinafter more fully explained.

The end portion of the hook member 23 shown uppermost in the drawings terminates in a head member 27 that is disposed within and projects through a cap 28 when the parts are in assembled relation. A U shaped key or locking member 29 is adapted to be inserted in grooves 30 in opposite sides of the portion of the head 27 that extends through and beyond the cap 28 on the head 27 of the hook member 23 and completes the assembly of this device.

An inner compression spring 31 is disposed on and around the members 13 and 22—23 between the filler member 20 and a yoke 33 on the upper end portion of the hole aligning member 13. The resilient force of this spring is exerted in one direction on the hole aligning member 13 and in an opposite direction on the hole aligning member 14. Obviously this tends to relatively move the two hole aligning members 13 and 14 in a manner to cause the inclined surfaces 15 and 16 to expand said hole aligning members diametrically against the walls of the holes 26 in the plates 25.

An outer compression spring 32 is disposed around the inner spring member 31 between the filler 20 and the cap 28. The resilient force of this outer spring 32 is thus exerted in one direction on the hook member 23 and in an opposite direction on the head 17 which rests in the bottom of the housing 10 and is rigid with the hole aligning member 14. The combined force of both springs 31 and 32 is thus exerted in one direction against the housing 10 and hole aligning member 14 while the force, in the opposite direction, of spring 31 is exerted on hole aligning member 13 and the force, in the opposite direction, of spring 32 is exerted on hook member 23.

The hole aligning member 14 has two arcs of contact with the cylindrical walls of the holes 26 in the plates 25, these arcs of contact being positioned respectively at opposite sides of the groove 21. The other hole aligning member 13 has an arc of contact with the walls of said holes 26 at a location substantially diametrically opposite to the groove 21. The curvature of these three arcs of contact is substantially the same as the curvature of the walls of the holes 26. This provides for aligning the holes 26 accurately and exactly when the two hole aligning members are expanded by the powerful wedging action of the inclined surfaces 15 and 16. The hole aligning members 13 and 14 are somewhat flattened on two opposite sides, as shown in Figs. 8 and 9.

In the operation of this hole aligner and plate tightener, to insert the same in registering holes 26 in overlapped plates 25 a conventional pliers type tool 34, fragments of which are shown in Fig. 2, is used to exert pressure in one direction on the head 27 and cap 28 and in an opposite direction on the flange 11. This compresses the springs 31 and 32 and moves the several cooperating parts of the device into a position as shown in Fig. 2. When the parts of this device are in relative positions as shown in Fig. 2 the over all transverse or diametrical dimension of the two hole aligning members 13 and 14 will be reduced sufficiently to allow these two members and the hook element 24 to be passed through the registering holes 26 in the plates 25. After parts 13, 14, and 24 have been passed through the holes 26 and the end of the housing 10 is against or near the plates 25 the force of compression on the pliers type tool 34 is released. When this is done the springs 31 and 32 will relatively move the hole aligning member 13 and hook member 23 in one direction and the hole aligning member 14 and housing 10 in an opposite direction. This expands the two hole aligning members 13 and 14 tightly in the holes 26 and at the same time clamps the overlapping plates 25 firmly together between the hook element 24 and the end of the housing 10.

It will be understood that large numbers of holes are usually provided in the overlapping plates, such as plates 25, and that these holes are very accurately positioned so that if several of said holes are aligned with precision by the insertion of several of these hole aligners and temporary plate tighteners then all of the other holes will be aligned with equal precision and permanent fasteners, such as rivets may be applied to said other holes. The rivets are made to fit the holes very snugly and if the holes are not aligned with great precision trouble may be experienced and time lost in getting the rivets into the holes and inferior riveting may result.

The wedging action of the inclined surfaces 15 and 16 will expand the hole aligning members 13 and 14 with great force in the holes 25 and will align said holes with great accuracy and precision. At the same time the force of the spring 32 will exert a strong pull on the hook member 22—23—24 to draw the overlapping plates 25 firmly together and hold them in face to face contact.

After said plates 25 have been permanently secured together at a number of points in the vicinity of the hole aligners and temporary fasteners then the hole aligners and temporary fasteners may be removed by applying the pliers 34 and compressing the springs 31 and 32 and thus reducing the over all diameter of the parts 13, 14 and 24.

After this hole aligner and temporary fastener has been properly applied to holes 26 in plates 25 the springs 31 and 32 will exert a constant force tending to align the holes and tending to draw the plates together. If the plates are then subjected to hammering or like vibration while these temporary fasteners are in the holes such vibration will cause the members 13, 14 and 24 to bind the plates more tightly both as respects hole aligning and drawing together of said plates. This is in contrast to some devices of this type which will be loosened by vibration.

For purposes of this application I have herein disclosed a preferred embodiment of my invention but it will be understood that changes may be made within the scope and spirit of the appended claims.

I claim:

1. A fastener and hole aligner for insertion into registering holes of two or more overlapping pieces of material to align said holes and draw said pieces together, comprising a housing; two relatively longitudinally movable hole aligning members carried by said housing and extending outwardly therefrom and having contacting faces that are oppositely tapered longitudinally of said members to provide for transverse expansion and contraction of said members in response to relative longitudinal movement thereof; and a longitudinally movable hook member separable from and movable independently of said two hole aligning members and cooperating with said two hole aligning members and said housing to draw said overlapping pieces together.

2. A fastener and hole aligner for insertion into registering holes of two or more overlapping pieces of material to align said holes and draw said pieces of material together, comprising a housing; two relatively longitudinally movably hole aligning members carried by said housing and extending outwardly therefrom and having contacting faces that are oppositely tapered longitudinally of said members to provide for transverse expansion and contraction of said members in response to relative longitudinal movement thereof; a longitudinally movable hook member separable from and movable independently of said two hole aligning members and cooperating with said two hole aligning members and said housing to draw said overlapping pieces together; and spring means operable to relatively move said two hole aligning members, said hook member and said housing.

3. A fastener and hole aligner for insertion into registering holes of two or more overlapping pieces of material to align said holes and draw said pieces of material together, comprising a housing; two relatively longitudinally movable hole aligning members carried by said housing and extending outwardly therefrom and having contacting faces that are oppositely tapered longitudinally of said members to provide for transverse expansion and contraction of said members in response to relative longitudinal movement thereof; a longitudinally movable hook member separable from and movable independently of said two hole aligning members and cooperating with said two hole aligning members and said housing to draw said overlapping pieces together; and spring means yieldingly urging said housing and one of said hole aligning members in one direction and said hook member and the other hole aligning member in the opposite direction.

4. A fastener and hole aligner for insertion into registering holes of two or more overlapping pieces of material to align said holes and draw said pieces of material together, comprising a housing; two relatively longitudinally movable hole aligning members carried by said housing and extending outwardly therefrom and having contacting faces that are oppositely tapered longitudinally of said members to provide for transverse expansion and contraction of said members in response to relative longitudinal movement thereof; a longitudinally movable hook member cooperating with said two hole aligning members and said housing to draw said overlapping pieces together; a spring yieldingly urging said two hole aligning members in opposite directions; and another spring yieldingly urging said housing and said hook member in opposite directions.

5. A fastener and hole aligner for insertion into registering holes of two or more overlapping pieces of material to align said holes and draw said pieces together, comprising a housing; two relatively longitudinally movable hole aligning members carried by said housing and extending outwardly therefrom and having contacting faces that are oppositely tapered longitudinally of said members to provide for transverse expansion and contraction of said members in response to relative longitudinal movement thereof; one of said hole aligning members having a longitudinal groove; a hook member having a shank operatively disposed within said groove and terminating at one end in a hook portion that extends outwardly from said groove; a spring yieldingly urging said two hole aligning members in opposite directions; and another spring yieldingly urging said housing and said hook member in opposite directions.

LOREN O. VINSON.

REFERENCES CITED

The following references are of record in the file of this patent:

UNITED STATES PATENTS

| Number | Name | Date |
| --- | --- | --- |
| 2,289,101 | Chester | July 7, 1942 |